US009457746B1

(12) United States Patent
Baccouche et al.

(10) Patent No.: US 9,457,746 B1
(45) Date of Patent: Oct. 4, 2016

(54) ENERGY ABSORBING SYSTEM FOR VEHICULAR IMPACTS

(71) Applicant: FORD GLOBAL TECHNOLOGIES, LLC, Dearborn, MI (US)

(72) Inventors: Mohamed Ridha Baccouche, Ann Arbor, MI (US); Saied Nusier, Canton, MI (US); Saeed David Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/936,217

(22) Filed: Nov. 9, 2015

(51) Int. Cl.
*B60R 19/34* (2006.01)
*B60R 19/02* (2006.01)

(52) U.S. Cl.
CPC ............ *B60R 19/023* (2013.01); *B60R 19/34* (2013.01)

(58) Field of Classification Search
CPC .......... B60R 19/34; B60R 2021/0023; B60R 19/32; B60R 19/023
USPC .............................. 293/133, 132; 296/187.1
See application file for complete search history.

(56) References Cited

U.S. PATENT DOCUMENTS

| | | | | |
|---|---|---|---|---|
| 2,553,237 A | * | 5/1951 | Camarero | F16F 13/00 114/219 |
| 3,899,047 A | * | 8/1975 | Maeda | B60R 19/34 188/374 |
| 3,915,486 A | * | 10/1975 | Maeda | B60R 19/34 188/371 |
| 7,357,445 B2 | * | 4/2008 | Gross | B62D 21/152 188/377 |
| 8,857,902 B2 | | 10/2014 | Sekiguchi et al. | |
| 8,991,903 B1 | * | 3/2015 | Alavandi | B60R 19/04 293/133 |
| 9,010,845 B1 | * | 4/2015 | Ramoutar | B60R 19/14 293/155 |
| 2003/0209915 A1 | * | 11/2003 | Yoshida | F16F 7/125 293/133 |
| 2006/0022473 A1 | * | 2/2006 | Hansen | B60R 19/34 293/133 |
| 2008/0042455 A1 | * | 2/2008 | Nees | B60R 19/34 293/132 |
| 2009/0243313 A1 | * | 10/2009 | Handing | B60R 19/34 293/133 |
| 2009/0302591 A1 | * | 12/2009 | Auer | B60R 19/54 280/784 |
| 2010/0140965 A1 | * | 6/2010 | Schoenberger | B60R 19/16 293/118 |
| 2010/0320782 A1 | * | 12/2010 | Akgun | B60R 19/34 293/133 |
| 2011/0233947 A1 | * | 9/2011 | Baccouche | B60R 19/34 293/133 |
| 2012/0091742 A1 | * | 4/2012 | Paare | B60R 19/18 293/132 |

(Continued)

FOREIGN PATENT DOCUMENTS

DE 4316164 A1 11/1994
DE 19511867 C1 5/1996

(Continued)

*Primary Examiner* — Gregory Blankenship
(74) *Attorney, Agent, or Firm* — Raymond L. Coppiellie; Brooks Kushman P.C.

(57) ABSTRACT

A vehicle includes a frame, a bumper, and an impact absorber. The impact absorber extends from the frame to the bumper. The impact absorber has a sliding member and a receiving member. The receiving member defines an orifice and a portion of the sliding member is disposed within the orifice. The sliding member is configured to slide into the receiving member during impact events such that the receiving member yields and flares outward to absorb energy.

19 Claims, 2 Drawing Sheets

(56) References Cited

U.S. PATENT DOCUMENTS

| | | | | |
|---|---|---|---|---|
| 2013/0069377 A1* | 3/2013 | Qu | ............ | B60R 19/34 293/133 |
| 2013/0119682 A1* | 5/2013 | Matuschek | ............ | B60R 19/34 293/133 |
| 2013/0307288 A1* | 11/2013 | Wavde | ............ | B60R 19/34 296/187.05 |
| 2014/0008923 A1* | 1/2014 | Han | ............ | B60R 19/18 293/126 |
| 2014/0091585 A1* | 4/2014 | Ramoutar | ............ | B60R 19/24 293/133 |
| 2014/0091595 A1* | 4/2014 | Ramoutar | ............ | B60R 19/24 296/187.09 |
| 2014/0353990 A1* | 12/2014 | Ishitobi | ............ | B60R 19/34 293/133 |
| 2015/0217709 A1* | 8/2015 | Kim | ............ | B60R 19/34 293/133 |
| 2015/0329144 A1* | 11/2015 | Hara | ............ | B62D 21/152 296/187.09 |
| 2015/0336525 A1* | 11/2015 | Nam | ............ | B60R 19/04 296/187.1 |
| 2016/0068125 A1* | 3/2016 | Wendel | ............ | B60R 19/26 293/133 |

FOREIGN PATENT DOCUMENTS

| | | |
|---|---|---|
| GB | 2503095 A | 12/2013 |
| JP | 2015137080 A | 7/2015 |

* cited by examiner

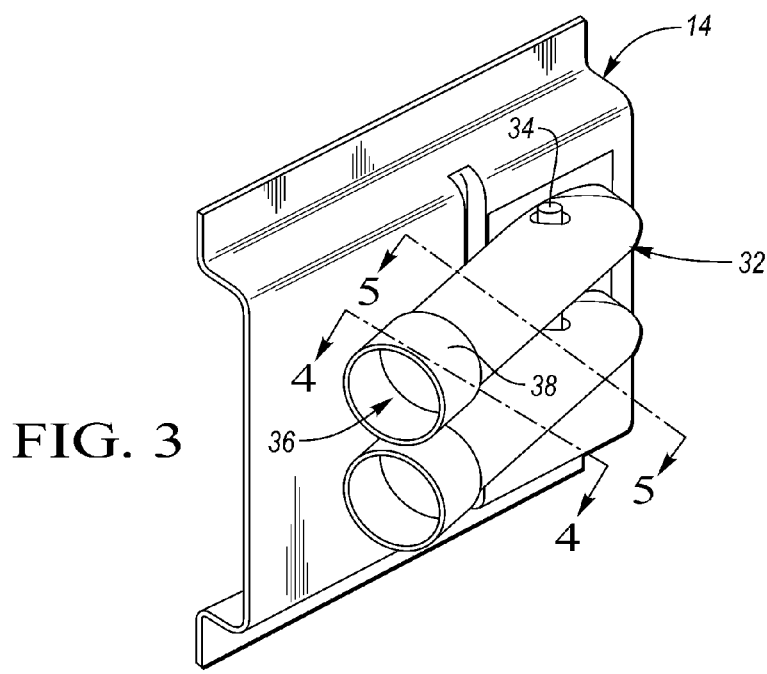
FIG. 3
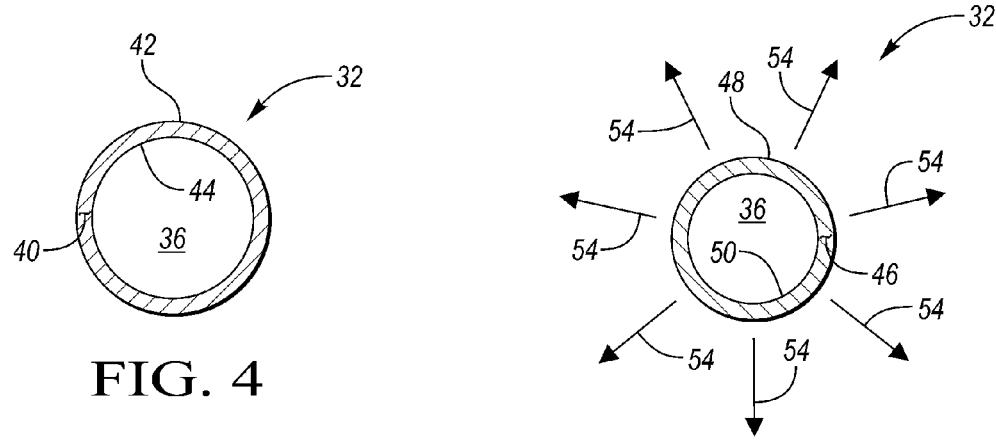
FIG. 4
FIG. 5
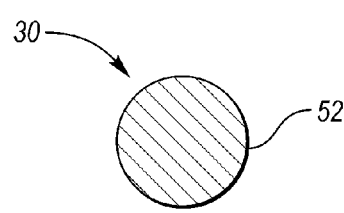
FIG. 6

ENERGY ABSORBING SYSTEM FOR VEHICULAR IMPACTS

TECHNICAL FIELD

The present disclosure relates to vehicle safety structures that are configured to protect vehicle passengers during impact events.

BACKGROUND

Vehicles may include structures that are designed to absorb energy in order to protect vehicle passengers during impact events.

SUMMARY

A vehicle includes a frame, a bumper, and an impact absorber. The impact absorber is secured to the bumper and the frame at proximal and distal ends of the impact absorber, respectively. The impact absorber includes a first cylinder and a second cylinder. The first cylinder is axially in registration with the second cylinder. The first cylinder is also slidable within the second cylinder such that the second cylinder plastically deforms outward to absorb energy during offset impact events.

A vehicle includes a frame, a bumper, and an impact absorber. The impact absorber extends from the frame to the bumper. The impact absorber has a sliding member and a receiving member. The receiving member defines an orifice and a portion of the sliding member is disposed within the orifice. The sliding member is configured to slide into the receiving member during impact events such that the receiving member yields and flares outward to absorb energy.

A vehicle includes a frame, a bumper, and an impact absorber. The impact absorber includes a first longitudinally extending member and a second longitudinally extending member. The first and second longitudinally extending members are secured between the bumper and frame. The second member includes a cross sectional area that has an outer circumference and an inner circumference that defines an orifice. A portion of the first member is disposed within the orifice and is configured to slide further into the second member during impact events resulting in plastic deformation and an expansion of the cross sectional area of the second member.

BRIEF DESCRIPTION OF THE DRAWINGS

FIG. 3 is an isometric view of the frame and a portion of the energy absorbing device;

FIG. 4 is a cross-sectional view of the energy absorbing device taken along line 4-4 in FIG. 3;

FIG. 5 is a cross-sectional view of the energy absorbing device taken along line 5-5 in FIG. 3; and FIG. 6 is a cross-sectional view of the energy absorbing device taken along line 6-6 in FIG. 1.

DETAILED DESCRIPTION

Figure 1:
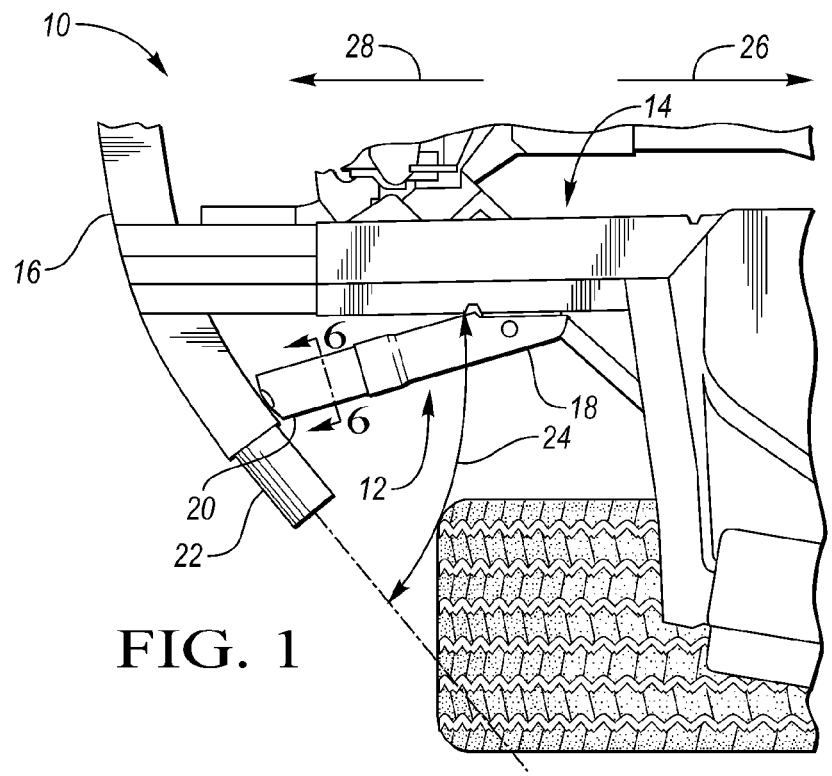
FIG. 1 is a plan view of a vehicle including an energy absorbing device disposed between the frame and the bumper.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Safety standards for vehicles being sold to the public include rating the amount of intrusion into the vehicle occupancy space after an impact. Crash tests are typically performed where vehicles are crashed into stationary objects in order to determine the amount of intrusion that occurs into various locations of the occupancy space. The crash tests include, among others, full frontal impacts into rigid barriers and small offset rigid barrier impacts. The full frontal impacts are meant to simulate collisions with large objects, while the small offset rigid barrier impacts are meant to simulate collisions with smaller objects such as telephone poles.

Structures within the vehicle, such as impact absorbers, may be used to absorb energy during an impact event while other structures within the vehicle may deflect objects away from the vehicle. For example, an impact absorber may be disposed between the bumper and the frame of the vehicle in order to absorb energy during an impact event while a deflector, such as a hook deflector, may be secured to the end of the bumper to deflect objects outward and away from the vehicle during an impact event.

Hook deflectors may be useful in deflecting objects outward during small offset rigid barrier impacts. Hook deflectors, however, may not be beneficial during full frontal impacts since they are not designed to absorb energy during an impact event. On the other hand, utilizing a deflector in conjunction with an impact absorber allows for both deflecting objects away from the vehicle during small offset rigid barrier impacts and absorbing energy during any type of impact.

Using a deflector in conjunction with an impact absorber may decrease the amount of intrusion into the vehicle occupancy space whether an impact is a small offset rigid barrier impact, a full frontal impact, or any other type of impact. The amount of intrusion into the vehicle occupancy space may be measured at a variety of locations within the interior of the vehicle. For example, the amount of intrusion into the vehicle occupancy space may be measured at the footrest position of the front passenger side of the vehicle, the brake pedal position, the steering wheel position, the dashboard position, the instrument panel position, the position of the sill, or any other reference position within the vehicle occupancy space.

Referring to FIG. 1, a vehicle 10 that includes an impact absorber 12 disposed between a frame 14 and bumper 16 of the vehicle 10 is illustrated. The impact absorber 12 may yield and plastically deform during an impact even in order to absorb the energy of the impact event. A distal end 18 of the impact absorber 12 may be secured to the frame 14 while a proximal end 20 of the impact absorber 12 is secured to the bumper 16.

The impact absorber 12 may further comprise a deflector 22 that is configured to deflect objects away from the frame 14 during offset impact events. The deflector may be disposed adjacent to the bumper 16 and at the proximal end of 20 of the impact absorber 12. The bumper 16 may define an opening or internal chamber that receives the deflector 22. The deflector 22 may extend from the bumper 16 laterally outward relative to the frame 14 and at an angle 24 towards a rear of the vehicle. Arrow 26 represents a direction that is pointing towards the rear of the vehicle 10, while arrow 28 represents a direction that is pointing towards the front of the vehicle 10.

Figure 2:
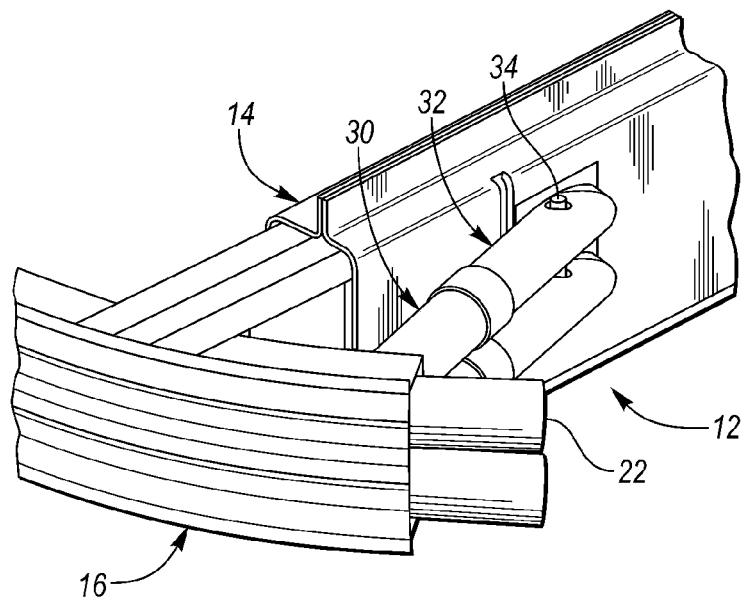
FIG. 2 is an isometric view of the frame, the bumper, and the energy absorbing device.

Referring to FIGS. 2 and 3, the impact absorber 12 may include a first longitudinally extending member 30 and a second longitudinally extending member 32. The first member 30 may also be referred to as a sliding member, while the second member 32 may also be referred to as a receiving member. The first member 30 may be secured to the bumper 16 while second member 32 is secured to the frame 14. The second member 32 may be pivotally secured to the frame 14 by a pin 34. The first member 30 and the second member 32 may both be cylinders. A cylinder may comprise a surface or solid bounded by two parallel planes and generated by a straight line moving parallel to the given planes and tracing a curve bounded by the planes and lying in a plane perpendicular or oblique to the given planes.

The first member 30 may be axially in registration with the second member 32 such that longitudinal axes of the first member 30 and second member 32 are in alignment with each other. The second member 32 may define an orifice 36. A portion (or first end) of the first member 30 may be disposed within the orifice 36. The deflector 22 may be secured to an end of the first member 30 opposite of the portion of the first member that is disposed within the orifice 36. The second member 32 may include a flared end 38. The flared end 38 may be configured to receive the portion of the first member 30 that is disposed within the orifice 36. The first member 30 may be slidable within the second member 32 during impact events such that when the first member 30 slides into the second member 32, the second member 32 yields and plastically deforms outward (or flares outward) to absorb the energy from the impact event.

The configuration depicted in FIGS. 2 and 3 includes a pair of impact absorbers 12 that each includes a first member 30 that is slidable within a second member 32. The disclosure, however, should not be construed as limited to this configuration but should include any configuration that has at least one impact absorber 12 that includes a first member 30 that is slidable within a second member 32.

Referring to FIGS. 4, 5, and 6, cross-sectional views of the first member 30 and the second member 32 are illustrated. FIG. 4 is a cross-sectional view of the second member 32 at the flared end 38. FIG. 5 is a cross-sectional view of a portion of the second member 32 that extends beyond the flared end 38. FIG. 6 is a cross-sectional view of the first member 30. Although FIG. 6 indicates that the first member 30 has a completely solid cross-section, the first member 30 may vary from the depiction in FIG. 6. For example the first member 30 may be a tube that includes an outer circumference and an inner circumference that defines an orifice.

The second member 32 includes a first cross-sectional area 40 at the flared end 38. The first cross-sectional area 40 includes an outer circumference 42. The outer circumference 42 may be a diameter if the cross-section is circular.

The first cross-sectional area 40 also includes an inner circumference 44 that defines the orifice 36. The inner circumference 44 may be a diameter if the orifice 36 is circular.

The second member 32 also includes a second cross-sectional area 46 that extends over the portion of the second member 32 that is beyond the flared end 38. The second cross-sectional area includes an outer circumference 48. The outer circumference 48 may be a diameter if the cross-section is circular. The second cross-sectional area 46 also includes an inner circumference 50 that also defines the orifice 36. The inner circumference 50 may be a diameter if the orifice 36 is circular.

The first member 30 includes an outer circumference 52. The outer circumference 52 may be a diameter if the cross-section of the first member 30 is circular. The inner circumference 44 at the flared end 38 of the second member 32 may be larger than the outer circumference 52 of the first member 30. The inner circumference 50 that extends over the portion of the second member 32 that is beyond the flared end 38 may be smaller than the outer circumference 52 of the first member 30.

A portion of the first member 30 may be received into and disposed within the orifice 36 at the flared end 38. The first member 30 may be configured to slide into the orifice 36 defined by the second member 32 during impact events resulting in an outward expansion of the cross-sectional area of the second member 32. During the impact event the outward expansion of the cross-sectional area of the second member 32 may result in the material of the second member 32 yielding and plastically deforming to absorb the energy from the impact event.

The portion of the second member 32 that extends beyond the flared end 38 may be the portion of the second member 32 that plastically deforms to absorb the impact energy during an impact event. When the first member 30 slides into the second member 32 beyond the flared end 38, the first member 30 pushes the second member outwards, since beyond the flared end, the outer circumference 52 of the first member 30 is larger than the inner circumference 50 of the second member 32. Therefore, the second cross-sectional area 46 of the second member 32, which extends over the portion of the second member 32 that is beyond the flared end 38, will expand outward yielding and plastically deforming to absorb the energy of impact events. The arrows 54 represent the outward expansion of the second cross-sectional area 46 which may occur during an impact event.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a frame;
   a bumper; and
   an impact absorber secured to the bumper and frame at proximal and distal ends of the impact absorber, respectively, and including a first cylinder and a second cylinder that is pivotally secured to the frame, wherein the first cylinder is axially in registration with and is slidable within the second cylinder such that the second cylinder plastically deforms outward to absorb energy during offset impact events.

2. The vehicle of claim 1, wherein the impact absorber further comprises a deflector disposed at the proximal end and adjacent to the bumper, the deflector being configured to deflect objects away from the frame during the offset impact events.

3. The vehicle of claim 2, wherein the deflector extends from the bumper laterally outward relative to the frame and at an angle towards a rear of the vehicle.

4. The vehicle of claim 1, wherein the second cylinder includes a flared end that is configured to receive a first end of the first cylinder.

5. The vehicle of claim 4, wherein the second cylinder defines an orifice that receives the first end of the first cylinder.

6. The vehicle of claim 5, wherein the second cylinder has an inner diameter that defines the orifice, and wherein the inner diameter is larger than a diameter of the first cylinder at the flared end and is not larger than the diameter of the first cylinder over a portion of the second cylinder that extends beyond the flared end.

7. The vehicle of claim 6, wherein the portion of the second cylinder that extends beyond the flared end plastically deforms outward to absorb energy during offset impact events.

8. A vehicle comprising:
   a frame;
   a bumper; and
   an impact absorber extending from the frame to the bumper, pivotally secured to the frame, and having sliding and receiving members, wherein the receiving member defines an orifice, a portion of the sliding member is disposed within the orifice, and the sliding member is configured to slide into the receiving member during impact events such that the receiving member yields and flares outward to absorb energy.

9. The vehicle of claim 8, wherein the impact absorber further comprises a deflector disposed adjacent to the bumper and secured to an end of the sliding member opposite the portion of the sliding member disposed within the orifice, the deflector being configured to deflect objects away from the frame during the impact events.

10. The vehicle of claim 9, wherein the deflector extends from the bumper laterally outward relative to the frame and at an angle towards a rear of the vehicle.

11. The vehicle of claim 8, wherein the receiving member includes a flared end that is configured to receive the portion of the sliding member that is disposed within the orifice.

12. The vehicle of claim 11, wherein the receiving member has an inner circumference that defines the orifice, and wherein the inner circumference is larger than a circumference of the sliding member at the flared end and is not larger than the circumference of the sliding member over a portion of the receiving member that extends beyond the flared end.

13. The vehicle of claim 12, wherein the portion of the receiving member that extends beyond the flared end plastically deforms outward to absorb energy during impact events.

14. The vehicle of claim 8, wherein the receiving member is pivotally secured to the frame.

15. A vehicle comprising:
   a frame;
   a bumper; and
   an impact absorber including first and second longitudinally extending members secured between the bumper and frame, the second member being pivotally secured to the frame, wherein the second member includes a cross sectional area having an outer circumference and an inner circumference that defines an orifice, and a portion of the first member is disposed within the orifice and is configured to slide further into the second member during impact events resulting in plastic deformation and outward expansion of the cross sectional area of the second member.

16. The vehicle of claim 15, wherein the impact absorber further comprises a deflector disposed adjacent to the bumper and secured to an end of the first member opposite the portion of the first member disposed within the orifice, the deflector being configured to deflect objects away from the frame during the impact events.

17. The vehicle of claim 16 wherein the deflector extends from the bumper laterally outward relative to the frame and at an angle towards a rear of the vehicle.

18. The vehicle of claim 15, wherein the second member includes a flared end that is configured to receive the portion of the first member that is disposed within the orifice.

19. The vehicle of claim 18, wherein the inner circumference of the second member that defines the orifice is larger than a circumference of the first member at the flared end and is not larger than the circumference of the first member over a portion of the second member that extends beyond the flared end.

* * * * *